United States Patent
Brouwer et al.

(10) Patent No.: US 9,811,376 B2
(45) Date of Patent: Nov. 7, 2017

(54) VIRTUAL MACHINE INSTANCE MIGRATION USING A TRIANGLE APPROACH

(71) Applicant: Amazon Technologies, Inc., Seattle, WA (US)

(72) Inventors: Pieter Kristian Brouwer, Issaquah, WA (US); Kristina Kraemer Brenneman, Bellevue, WA (US); Marc John Brooker, Seattle, WA (US); Jerry Lin, Seattle, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/754,497

(22) Filed: Jun. 29, 2015

(65) Prior Publication Data

US 2016/0378546 A1    Dec. 29, 2016

(51) Int. Cl.
*G06F 9/455* (2006.01)
*G06F 9/48* (2006.01)

(52) U.S. Cl.
CPC ........ *G06F 9/4856* (2013.01); *G06F 9/45558* (2013.01); *G06F 2009/4557* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 8,429,346 B1 | 4/2013 | Chen et al. | |
| 2005/0268298 A1 | 12/2005 | Hunt et al. | |
| 2006/0005189 A1* | 1/2006 | Vega | G06F 9/4856 718/1 |
| 2006/0069886 A1 | 3/2006 | Tulyani | |
| 2010/0049917 A1 | 2/2010 | Kono et al. | |
| 2011/0040943 A1 | 2/2011 | Kondo et al. | |
| 2011/0082988 A1 | 4/2011 | Kono et al. | |
| 2011/0173622 A1 | 7/2011 | Shin et al. | |
| 2011/0219372 A1 | 9/2011 | Agrawal et al. | |

(Continued)

OTHER PUBLICATIONS

Jo et al., Efficient Live Migration of Virtual Machines Using Shared Storage, 2013.*

(Continued)

*Primary Examiner* — H S Sough
*Assistant Examiner* — Zhan Chen
(74) *Attorney, Agent, or Firm* — Davis Wright Tremaine LLP

(57) ABSTRACT

Techniques for preserving the state of virtual machine instances during a migration from a source location to a target location are described herein. A set of credentials configured to provide access to a storage device by a virtual machine instance at the source location is provided to the virtual machine instance. When the migration from the source location to the target location starts, a second set of credentials configured to provide access to a storage device by a virtual machine instance at the source location is provided to the virtual machine instance. During the migration, a response to an input-output request is provided to one or more of the locations using the set of credentials and based at least in part on the state of the migration.

20 Claims, 11 Drawing Sheets

(56) References Cited

U.S. PATENT DOCUMENTS

| | | | |
|---|---|---|---|
| 2011/0270945 A1* | 11/2011 | Shiga | G06F 3/0605 709/213 |
| 2012/0042034 A1 | 2/2012 | Goggin et al. | |
| 2013/0111221 A1 | 5/2013 | Fujii et al. | |
| 2014/0082616 A1 | 3/2014 | Kurita | |
| 2015/0378759 A1* | 12/2015 | Pershin | G06F 9/45558 718/1 |

OTHER PUBLICATIONS

Kim et al., Guide-Copy: Fast and Silent Migration of Virtual Machine for Datacenters, 2013.*
Hines et al., Post-Copy Based Live Virtual Machine Migration Using Adaptive Pre-Paging and Dynamic Self-Ballooning, 2009.*
International Search Report and Written Opinion mailed Sep. 22, 2016, in International Patent Application No. PCT/US2016/039863, filed Jun. 28, 2016.
VMware, "VMware vMotion, how it works—Part 1 Introduction," Jun. 26, 2015, retrieved from on Sep. 2, 2016, at http://www.opvizor.com/vmware-vmotion-how-it-works-part-1-introduction/, 4 pages.
Clark et al., "Live Migration of Virtual Machines," Proceedings of the 2nd USENIX Symposium on Networked Systems Design and Implementation (NSDI 2005), May 2-4, 2005, XP-002720370, retrieved Feb. 7, 2014, from https://www.usenix.org/legacy/event/nsdi05/tech/full_papers/clark/clark.pdf, pp. 273-286.
Bogdan et al., "A Hybrid Local Storage Transfer Scheme for Live Migration of I/O Intensive Workloads," Jun. 1, 2012, XP055299791, retrieved from internet on Sep. 5, 2016, at https://hal.inria.fr/hal-00686654/PDF/paper.pdf, 13 pages.

* cited by examiner

VIRTUAL MACHINE INSTANCE MIGRATION USING A TRIANGLE APPROACH

CROSS-REFERENCE TO RELATED APPLICATIONS

This application incorporates by reference for all purposes the full disclosure of co-pending U.S. patent application Ser. No. 14/754,519, filed concurrently herewith, entitled "PRESERVING STATE DURING VIRTUAL MACHINE INSTANCE MIGRATION".

BACKGROUND

Modern computer systems are frequently implemented as collections of virtual computer systems operating collectively on one or more host computer systems. The virtual computer systems may utilize resources of the host computer systems such as processors, memory, network interfaces, and storage services. When the resources of a particular host computer system become scarce due to, for example, overutilization by client virtual computer systems, it may become necessary to move a virtual computer system to a different host computer system to avoid reduced system performance, increased system outages or failures, and a degraded user experience. Migration of virtual computer systems to different host computer systems may be desired for other reasons as well, such as maintenance of the host computer system, a hardware upgrade to the host computer system, replacement of the host computer system with another host computer system, malfunction of the host computer system, and other reasons.

One approach to the problem of moving or migrating a virtual computer system to a different host computer system is to halt the virtual computer system, copy the memory and/or the system state of the virtual computer system to the different host computer system, and then restart the virtual computer system. However, in the case of a large or complicated virtual computer system, this migration process can take a significant amount of time, and the ability of a user to interact with the virtual computer system during that time period may be eliminated or at least severely restricted. Additionally, some system resources, such as attached storage and network connections may be volatile, introducing the possibility that the migrated virtual computer system may differ significantly from the original virtual computer system, further introducing operational issues.

BRIEF DESCRIPTION OF THE DRAWINGS

Various embodiments in accordance with the present disclosure will be described with reference to the drawings, in which.

DETAILED DESCRIPTION

Figure 1:
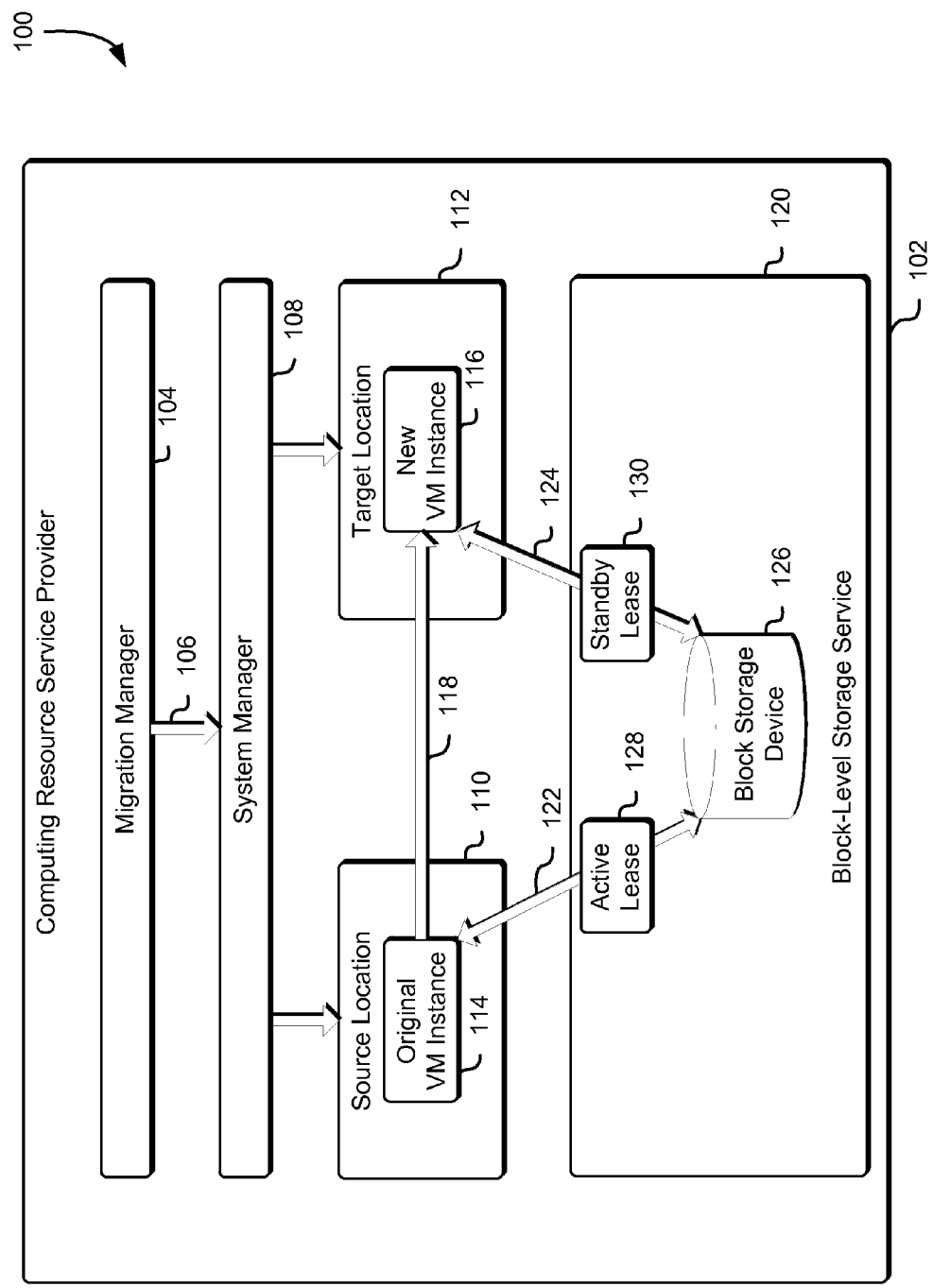
FIG. 1 illustrates an example environment where a virtual machine instance is migrated to a new location in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for managing the migration of resources and resource states of a virtual computer system (also referred to herein as a "virtual machine instance") during the migration of the virtual machine instance from a source host computer system to a target host computer system. The methods, systems, and processes described herein manage the migration of a virtual machine instance resources in phases and are configured to reduce both the length and impact of a critical migration phase (e.g., a phase in the migration where changes to the virtual machine instance can adversely affect the migration). In the examples described herein, access to block storage devices provided by a block-level storage service is managed during migration of the virtual machine instance so that the state of the virtual machine instance and the state of the block storage devices is not impacted by the migration. Such management improvement is attained by managing access to the resources during the critical migration phase and by routing responses to input-output requests during the migration so that state is preserved.

A virtual machine migration typically may proceed in phases. As a result of determining that a running virtual machine instance is a candidate for migration from a source host computer system to a suitable target host computer system, the target host computer system may first be prepared for the migration. The target location may be selected from a set of possible candidate locations based at least in part on the configuration of the running virtual machine instance. A new instance of the virtual machine may then be created on the target with the same configuration as the original virtual machine instance and memory and state information from the original virtual machine instance may be copied to the new virtual machine instance while the original virtual machine instance continues to run.

During this phase of the migration, resources associated with the running virtual machine instance may be identified and their migration to the target location may begin. In the case of block storage devices, it is critical at this state to begin managing the state of the block storage device. As a simple illustration of why this is important, consider a case where a process on a running virtual machine instance creates a file (a first input-output request), writes a first value to that file (a second input-output request), writes a second value to that file (a third input-output request), reads back the value (a fourth input-output request), and then deletes the file (a fifth input-output request). During a migration, different virtual machine instances may be in different stages of these five input-output requests and, if any of these five requests are received in an incorrect order, very different results may result. In a pathological example, the file may be deleted before the second request, resulting in an error.

Using the techniques described herein, when the migration begins, a triangle approach to managing access to the block storage device is used. Using the triangle approach, when input-output requests are received from the virtual machine instance at the source location, responses to those requests are provided to the virtual machine instance at the target location. This maintains state and ensures correct ordering of responses. During the critical migration phase access by original virtual machine instance to the block storage may then be locked (i.e., all input-output requests may be prevented to ensure no additional changes occur). One portion of the critical phase is the "flip," when the source virtual machine instance is no longer used and the target virtual machine becomes the active one. During the flip, the final changes to the memory and/or state of the original virtual machine instance can be propagated to the new virtual machine instance so that the two virtual machine instances are identical, including any blocked or pending input-output requests.

If the flip completes successfully and the critical phase completes successfully, the new virtual machine instance will then be operable, and the access by the original virtual machine instance to the block storage will be terminated (e.g., by setting a lease status to "inactive"). The new virtual machine instance may then have an active lease with full and exclusive access to the block storage device. If the flip does not complete successfully and the critical phase does not complete successfully, either as a result of an error, a cancellation, or some other such event, the original virtual machine instance will have its access to the block storage device restored and request responses will be resent after appropriate timeouts.

FIG. 1 illustrates an example environment 100 where a virtual machine instance is migrated to a new location in accordance with at least one embodiment. One or more virtual machine instances may be operating on host computer systems provided by a computing resource service provider 102. In the example illustrated in FIG. 1, a first virtual machine instance (the original VM instance 114) is running in a first location (the source location 110). The first location may be one or more host computer systems configured to provide shared hardware to a virtual computer system service for the instantiation of one or more virtual machine instances. The original VM instance 114 may be one of a plurality of virtual machine instances associated with the source location 110. Each of the plurality of virtual machine instances associated with the source location 110 may in one of several states, such as running, paused, suspended (e.g., paused and stored to secondary storage), or some other state. In the example illustrated in FIG. 1, the original VM instance 114 is running (i.e., is performing one or more operations). The original VM instance 114 in the source location 110 may have been previously migrated to the source location 110 from another location as the result of a previous migration.

In the course of the operation of the original VM instance 114, it may be determined to migrate the original VM instance 114 from the source location 110 to a target location 112. The determination to migrate the original VM instance 114 may be made as a result of changes in the availability of resources at the source location 110 (e.g., a shortage of computing power, a shortage of memory, or a lack of network bandwidth). The determination to migrate the original VM instance 114 may also be made to move the original VM instance 114 logically closer to one or more computing resource service provider resources. The determination to migrate the original VM instance 114 from the source location 110 to a target location 112 may also be made by a customer request to, for example, reduce one or more costs associated with the original VM instance 114. The determination to migrate the original VM instance 114 from the source location 110 to a target location 112 may also be made by a service, process, or module operating in association with the computing resource service provider that may be configured to determine more optimal locations form virtual machine instances. In the example illustrated in FIG. 1, the target location 112 is shown within the computing resource service provider 102. In an embodiment, either the source location 110, the target location 112, or both can be outside of the computing resource service provider 102 (e.g., they may be provided by customer and/or other third party environments).

The request to migrate the original VM instance 114 from the source location 110 to the target location 112 may be received by a migration manager 104 operating with the computing resource service provider 102. In an embodiment, the migration manager 104 is implemented as a service that may be one of a plurality of services provided by the computing resource service provider 102. The migration manager 104 may also be referred to herein as a migration manager computer system and, in some embodiments, can be implemented as a distributed computer system.

When migrating the original VM instance 114 from the source location 110 to the target location, a number of systems, services, processes, and resources may be communicating with the original VM instance 114. These systems, services, processes, and resources cannot generally be guaranteed to change their behavior simultaneously so that their communications switch from the original VM instance 114 at the source location 110 to a new VM instance 116 at the target location 112. The migration manager 104 may be configured to communicate with each of the plurality of systems, services, processes, and resources in order to manage the migration. The migration manager 104 may be configured to manage (or orchestrate) the migration by performing actions including, but not limited to, determining the proper order for migration, managing a workflow for migration, issue commands to the systems, services, processes, and resources associated with the migration, determining whether the migration is successful, starting and stopping virtual machine instances, determining whether the migration has failed, determining whether the migration should be cancelled, and managing rollback if errors occur.

During a migration, each of the plurality of systems, services, processes, and resources associated with the migration may only be made aware of their portion of the migration. The migration manager 104 may, for example, manage the migration in phases and may manage the migration of each of the plurality of systems, services, processes, and resources associated with the migration by issuing API requests, making library calls, using interfaces (e.g., a web interface), or by some other means. The phase of a migration (also referred to herein as the "current state of the migration") may determine whether requests such as application programming interface requests may be allowed or blocked, and may also be used to determine whether a migration should be cancelled.

The migration manager 104 may also manage timeouts for each of the phases and/or for each migration action associated with each of the plurality of systems, services, processes, and resources associated with the migration which may also be used to determine whether a migration should be cancelled. For example, a block-level storage service such as the block-level storage service 120 may, during a migration, receive an API request from the migration manager 104 to provide access to a block storage device 126 by the new VM instance 116. As part of this access, the block-level storage service may need to synchronize input-output ("I/O") requests between the original VM instance 114 and the new VM instance 116. The migration manager 104 may establish a timeout value for this synchronization so that, for example, if the block-level storage service does not respond to the API request in a reasonable amount of time, the migration may be cancelled.

When the request to migrate the original VM instance 114 from the source location 110 to the target location 112 is be received by a migration manager 104 operating with the computing resource service provider 102, one or more commands 106 may be generated by the migration manager 104 in response to that request. The one or more commands 106 may then be sent to a system manager 108 operating with the computing resource service provider 102. In an embodiment, the system manager 108 is implemented as a service that may be one of a plurality of services provided by the computing resource service provider 102.

The one or more commands 106 that may be sent from the migration manager 104 to the system manager 108 in response to the request to migrate may include commands to configure the target location to instantiate a new virtual machine instance, commands to instantiate a new virtual machine instance at the target location 112, commands to copy the memory and/or state from the original VM instance 114 to a new VM instance 116, commands to deactivate the original VM instance 114, commands to activate the new VM instance 116, commands to lock either the original VM instance 114 or the new VM instance 116, commands to pause either the original VM instance 114 or the new VM instance 116, commands to unpause either the original VM instance 114 or the new VM instance 116, commands to forward memory and/or state information from the original VM instance 114 to the new VM instance 116, commands to tear down the original VM instance 114, commands to terminate a migration between the source location 110 and the target location 112, and other such commands associated with the migration 118 of the original VM instance 114 from the source location 110 to the target location 112.

The original VM instance 114 may have access 122 to a block storage device 126 provided by a block-level storage service 120. The block-level storage service 120 may be provided by the computing resource service provider 102. Access 122 to the block storage device 126 by the original VM instance 114 may be configured by the block-level storage service 120 using a lease. In the example illustrated in FIG. 1, the access 122 to the block storage device 126 by the original VM instance 114 is configured by the block-level storage service 120 using an active lease 128, which is a lease that temporarily provides access to the block storage device 126 to, for example, allow the original VM instance 114 to issue input-output requests and to receive responses to those input-output requests.

The new VM instance 116 may also have access 124 to the block storage device 126 provided by a block-level storage service 120. Access 124 to the block storage device 126 by the new VM instance 116 may be configured by the block-level storage service 120 using a lease. In the example illustrated in FIG. 1, the access 124 to the block storage device 126 by the new VM instance 116 is configured by the block-level storage service 120 using a standby lease 130 (i.e., a lease with a status of standby), which is a lease that temporarily provides partial access to the block storage device 126 to, for example, allow the new VM instance 116 to receive responses to input-output requests generated by, for example, the original VM instance 114 using the active lease 128 (i.e., a lease with a status of active) but that does not allow the new VM instance 116 to generate such requests.

As used herein, a lease, generally speaking, may be a grant of rights and permissions to access a computer system resource such as, for example, a block storage device 126. The lease may specify access (also referred to herein as an "access policy" or a "policy of access") to the computer system resource. A lease may be provided by a service (e.g., the block-level storage service 120) or by a different process, module, service, application, or system operating in conjunction with the service and implemented on one or more computer systems. The block-level storage service 120 may be implemented as a block-level storage service computer system and may, for example, be a distributed computer system operating on one or more computer systems and/or in one or more computer system environments. A lease may specify a type of access, permissions and/or credentials associated with that access, a duration of that access, or other parameters associated with access to the resource. For example, a lease may be a temporary lease that grants access to a resource for a limited or set time duration. Examples of such temporary leases are leases that assign a network address on a mobile network. Such temporary leases must typically be renewed (either manually or automatically) after a set period of time.

A lease may be provided by a service such as block-level storage service 120 to manage access to resources (i.e., the block storage devices associated with the service) and provide that access to clients such as other services, virtual machine instances, users (also referred to herein as "customers"), processes, applications, modules, systems, and the like. A lease may be granted to a client (e.g., the original VM instance 114 or the new VM instance 116) by the service and, thus, the client may have access to the resource for the duration of the lease. In an embodiment, a lease can be permanent in that the lease can be granted for the life of the client.

The use of a lease may also allow the service to manage its own resources by, for example, using the number and type of currently issued leases to determine whether the system is oversubscribed or is likely to become oversubscribed in the future. Additionally, by categorizing different leases by type (referred to herein as "lease status" or more simply as "status"), a service such as block-level storage service 120 may manage functionality associated with the resources of the service.

For example, an active lease of a block storage device provided to a client VM instance may allow full access to send input-output requests from the client VM instance to the block storage device and may also indicate that all responses to those requests (from the block storage device) be sent to the client VM instance. Conversely, an inactive lease is a lease that may still exist, but has restricted permissions. For example, a lease of a block storage device provided to a client VM instance that has an inactive status may restrict both the sending of input-output requests from the client VM instance to the block storage device and may prevent any responses to any previously pending requests from being sent to the client VM instance. Other lease statuses may exist including, but not limited to, a standby lease that may allow sending of input-output requests from the client VM instance to the block storage device but that may indicate that all responses to those requests (from the block storage device) be sent to a different VM instance.

Figure 2:
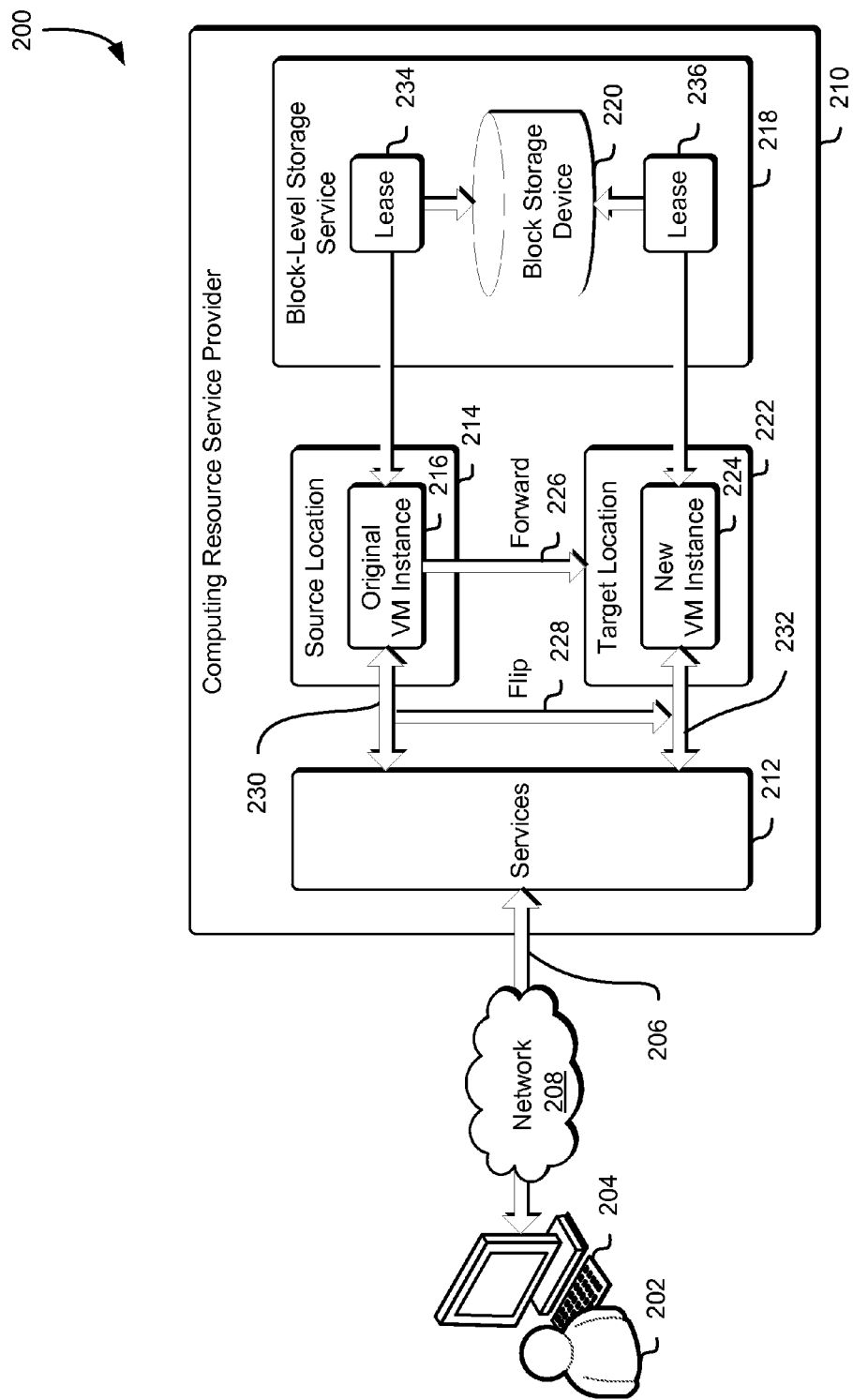
FIG. 2 illustrates an example environment where the migration of a virtual machine instance is managed in accordance with an embodiment.

FIG. 2 illustrates an example environment 200 where the migration of a virtual machine instance is managed as described in FIG. 1 and in accordance with at least one embodiment. A user 202 may connect 206 to one or more services 212 through a computer system client device 204. The services 212 may be provided by a computing resource service provider 210. In some embodiments, the computing resource service provider 210 may provide a distributed, virtualized, and/or datacenter environment within which one or more applications, processes, services, virtual machines, and/or other such computer system entities may be executed. In some embodiments, the user 202 may be a person, or may be a process running on one or more remote computer systems, or may be some other computer system entity, user, or process.

The command or commands to connect to the computer system instance may originate from an outside computer system and/or server, or may originate from an entity, user or process on a remote network location, or may originate from an entity, user or process within the computing resource service provider, or may originate from a user of the computer system client device 204, or may originate as a result of an automatic process, or may originate as a result of a combination of these and/or other such origin entities. In some embodiments, the command or commands to initiate the connection 206 to the computing resource service provider 210 may be sent to the services 212, without the intervention of the user 202. The command or commands to initiate the connection 206 to the services 212 may originate from the same origin as the command or commands to connect to the computing resource service provider 210, or may originate from another computer system and/or server, or may originate from a different entity, user, or process on the same or a different remote network location, or may originate from a different entity, user, or process within the computing resource service provider, or may originate from a different user of a computer system client device 204, or may originate as a result of a combination of these and/or other such same and/or different entities.

The user 202 may request connection to the computing resource service provider 210 via one or more connections 206 and, in some embodiments, via one or more networks 208 and/or entities associated therewith, such as servers connected to the network, either directly or indirectly. The computer system client device 204 that may request access to the services 212 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines, and/or other types of computing devices and/or components. The network may include, for example, a local network, an internal network, a public network such as the Internet, or other networks such as those listed or described below. The network may also operate in accordance with various protocols such as those listed or described below.

The computing resource service provider 210 may provide access to one or more host machines, as well as provide access one or more virtual machine (VM) instances as may be operating thereon. The services 212 provided by the computing resource service provider 210 may also be implemented as and/or may utilize one or more VM instances as may be operating on the host machines. For example, the computing resource service provider 210 may provide a variety of services to the user 202 and the user 202 may communicate with the computing resource service provider 210 via an interface such as a web services interface or any other type of interface. While the example environment illustrated in FIG. 2 shows a single connection or interface for the services 212 of the computing resource service provider 210, each of the services may have its own interface and, generally, subsets of the services may have corresponding interfaces in addition to or as an alternative to the single interface.

The computing resource service provider 210 may provide various services 212 to its users or customers. The services provided by the computing resource service provider 210 may include, but may not be limited to, virtual computer system services, block-level data storage services, cryptography services, on-demand data storage services, notification services, authentication services, policy management services, or other services. Not all embodiments described may include all of these services, and additional services may be provided in addition to or as an alternative to the services explicitly described. As described above, each of the services 212 may include one or more web service interfaces that enable the user 202 to submit appropriately configured API requests to the various services through web service requests. In addition, each of the services 212 may include one or more service interfaces that enable the services to access each other (e.g., to enable a virtual machine instance provided by the virtual computer system service to store data in or retrieve data from an on-demand data storage service and/or to access one or more block-level data storage devices provided by a block-level data storage service).

In an example, a virtual computer system service may be a collection of computing resources configured to instantiate virtual machine instances on behalf of a customer such as the user 202. The customer may interact with the virtual computer system service (via appropriately configured and authenticated API requests) to provision and operate virtual machine instances that are instantiated on physical computing devices hosted and operated by the computing resource service provider 210. The virtual computer system service may also be configured to initiate the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

In another example, a block-level data storage service such as the block-level storage service 218 may comprise one or more computing resources that collectively operate to store data for a customer using block storage devices 220 (and/or virtualizations thereof). The block storage devices of the block-level data storage service may, for example, be operationally attached to virtual machine instances provided by the virtual computer system service described herein to serve as logical units (e.g., virtual drives) for the computer systems. A block storage device may enable the persistent storage of data used/generated by a corresponding virtual machine instance where the virtual computer system service may only provide ephemeral data storage for the virtual machine instance. In the example illustrated in FIG. 2, the block-level storage service 218 is configured to provide access to a block storage device 220 using a first lease 234 (i.e., from the original VM instance 216 to the block storage device 220) and is also configured to provide access to the block storage device 220 using a second lease 236 (i.e., from the new VM instance 224 to the block storage device 220).

In the example illustrated in FIG. 2, the one or more services 212 may be implemented as, or may be supported by one or more virtual machine instances as described above. For example, the one or more services 212 may include an original VM instance 216 visible to the user 202 (i.e., configured such that the user 202 may use and/or otherwise interact with the original VM instance 216). The original VM instance 216 may be running at first, or source location 214, as described above. Upon receiving a command to migrate the original VM instance 216 from the source location 214 to a target location 222, a migration manager may direct the system manager (both as described in connection with FIG. 1) to begin the migration from the source location 214 to the target location 222 as described above. The migration may be accomplished by instantiating a new VM instance 224 at the target location 222 and copying memory and/or state from the original VM instance 216 to the new VM instance 224. The migration may also be accomplished by forwarding 226 memory and/or state changes from the original VM instance 216 to the new VM instance 224. For example, if during the migration, the user 202 alters a memory location on the original VM instance 216 (e.g., as a result of executing an application) after that memory has copied from the original VM instance 216 to the new VM instance 224, the new memory value may be forwarded to the new VM instance 224. This forwarding 226 of memory and/or state changes may serve to keep the new VM instance 224 synchronized with the original VM instance 216 during migration.

As described herein, the last phase of the migration prior to cleanup is the flip 228. During the flip 228, the original VM instance 216 may have some or all changes locked out so that the user 202 and/or other processes associated with the original VM instance 216 may not alter or mutate the original VM instance 216. During the flip 228, any remaining differences between the original VM instance 216 and the new VM instance 224 may then be copied from the original VM instance 216 to the new VM instance 224.

If the flip 228 is successful, the connection 230 from the services 212 to the original VM instance 216 may be replaced by a connection 232 from the services 212 to the new VM instance 224 so that, from the user's perspective, the backing VM instance appears to be the same as before the migration (because, for example, the new VM instance 224 may be substantially the same as the original VM instance 216). If the flip 228 is successful, the migration may enter a success phase (also referred to herein as a "migration success" phase) where additional processing may occur in response to the successful migration. Conversely, if the flip is not successful, the connection 230 from the services 212 to the original VM instance 216 may be retained so that, from the user's perspective, the backing VM instance is appears to be the same as before the attempted migration (because it has not changed). If the flip 228 is not successful, the migration may enter a failure phase (also referred to herein as a "migration failure" phase) where additional processing may occur in response to the failed migration. Thus, regardless of whether the migration is successful or not (e.g., because of failure or cancellation), the user may still perceive the same system state and may consider the original VM instance 216 and the new VM instance 224 as the same.

In an embodiment, a migration manager can determine whether the flip is successful by comparing a state of the original VM instance 216 to a state of the new VM instance 224. The state of the original VM instance 216 can be determined after the original VM instance 216 is locked and can be updated due to changes that may occur as the original VM instance 216 converges. The state of the new VM instance 224 can be determined after the flip has completed and after all changes have been forwarded from the original VM instance 216 to the new VM instance 224 (e.g., also after the original VM instance 216 converges). If a difference between the state of the original VM instance 216 and the state of the new VM instance 224 is below a minimum success threshold (i.e., the differences are minor, insignificant, or immaterial), then the flip is successful. Conversely if the difference between the state of the original VM instance 216 and the state of the new VM instance 224 is above the minimum success threshold (i.e., the differences are major, significant, or material), then the flip is a failure. Note that when the migration is cancelled or when requests are blocked, the differences may be above the minimum success threshold and the flip may be a failure.

Figure 3:
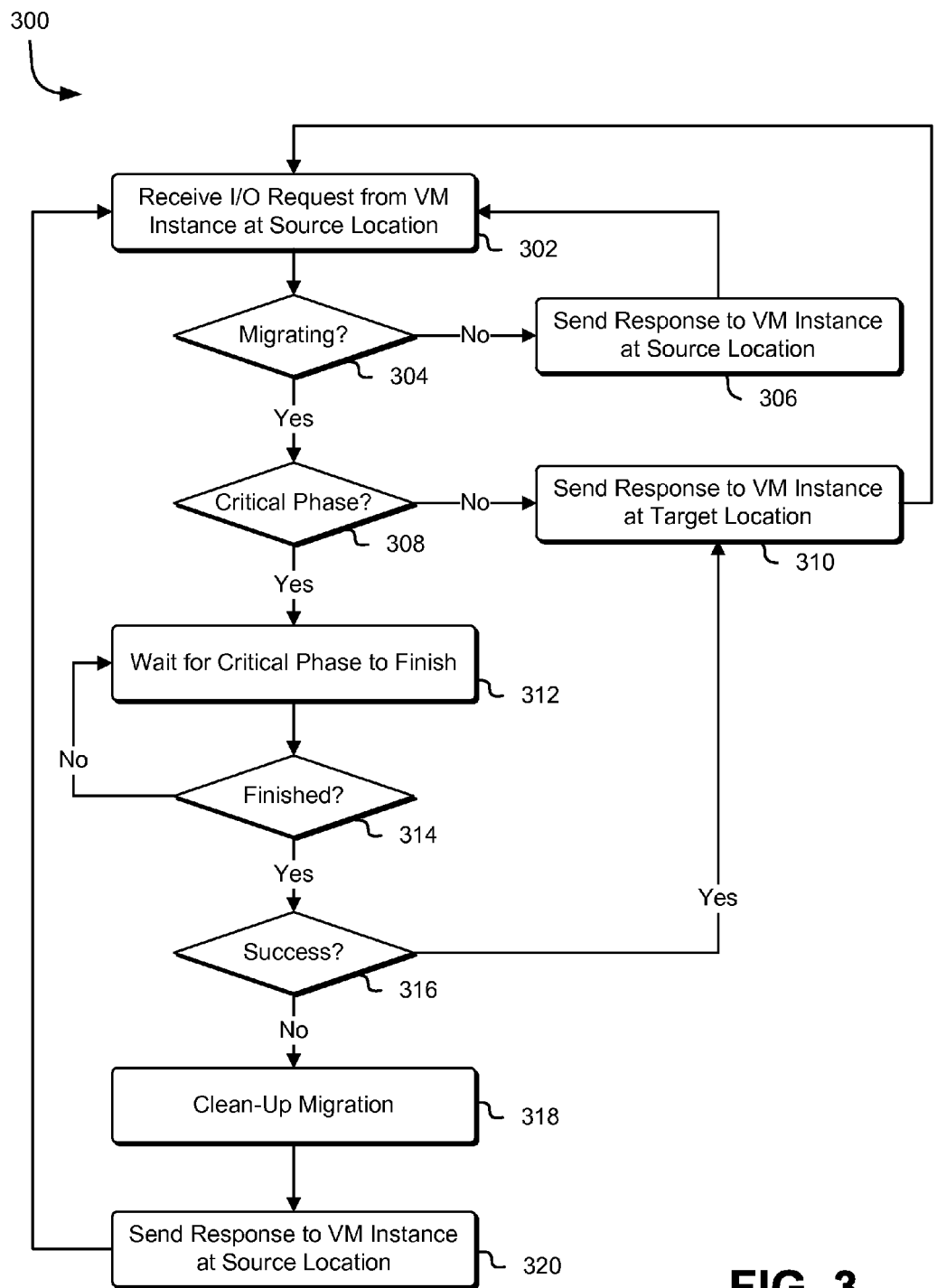
FIG. 3 illustrates an example process for determining the response location for an input-output request during the migration of a virtual instance in accordance with an embodiment.

FIG. 3 illustrates an example process 300 for determining the response location for an input-output request during the migration of a virtual instance as described in FIG. 1 and in accordance with at least one embodiment. A block-level storage service, such as block-level storage service 120 described in connection with FIG. 1, may perform the process illustrated in FIG. 3.

The block-level storage service may first receive 302 an input-output request from a virtual machine instance at a source location. The input-output request may be associated with a block storage device provided by the block-level storage service and may be associated with a lease (i.e., one or more sets of credentials and/or a temporary sets of credentials) for the block storage device, which may be provided by the block-level storage service. If it is determined that the virtual machine instance is not in the process of migrating 304 from the source location to a target location (e.g., from a source computing device to a destination computing device), the response may be sent to the originator of the request, which in this case, is the virtual machine instance at the source location.

If it is determined that the virtual machine instance is in the process of migrating 304 from the source location to a target location, it may next be determined 308 whether the migration is at a critical phase wherein both virtual machine instances should be locked and all changes blocked or enqueued until the critical phase completes. If it is not determined 308 that the migration is at a critical phase, the response may be sent to the virtual machine instance at the target location 310 so as to preserve the state of the migrated virtual machine. Conversely, if it is determined 308 that the migration is at a critical phase, the block-level storage service may wait for the critical phase to finish 312 before continuing.

After the critical phase is finished 314, it may next be determined whether the migration of the virtual machine instance was a success 316. If so, the virtual machine instance at the target location is the new valid virtual machine instance and the response may be sent to the virtual machine instance at the target location 310. If not, the virtual machine instance at the source location remains the valid virtual machine instance. The block-level storage device may first clean up any parts of the migration 318 and may send the response 320 to the originator of the request, which in this case, is the virtual machine instance at the source location.

Figure 4:
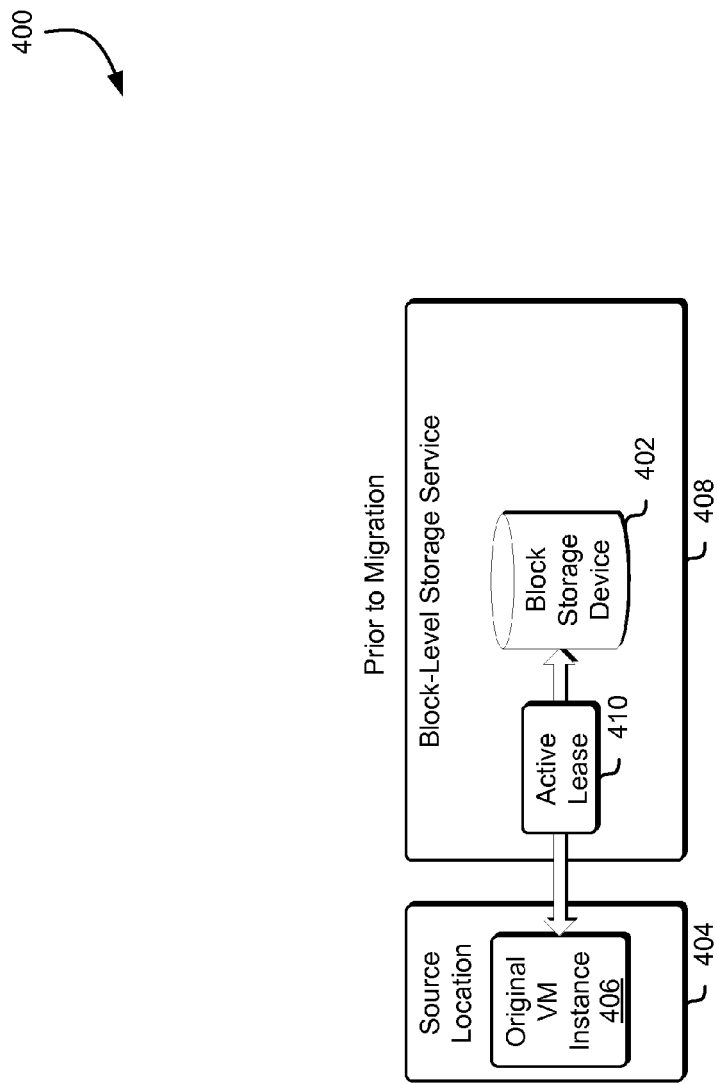
FIG. 4 illustrates an example environment where a block-level storage service provides access to a block storage device prior to a virtual machine instance migration in accordance with an embodiment.

FIG. 4 illustrates an example environment 400 where a block-level storage service provides access to a block storage device prior to a virtual machine instance migration as described in connection with FIG. 1 and in accordance with at least one embodiment. Prior to the migration, the original VM instance 406 may be running at the source location 404 with access to a block storage device 402 provided by a block-level storage service 408. A lease 410 configured to provide access by the original VM instance 406 to the block storage device 402 is provided by the block-level storage service 408. In the example illustrated in FIG. 4, the lease 410 is an active lease and input-output requests received from the original VM instance 406 have responses generated and sent to the original VM instance 406 at the source location 404. As described herein, the active lease 410 may be temporarily provided to the original VM instance and may be managed by the block-level storage service 408.

Figure 5:
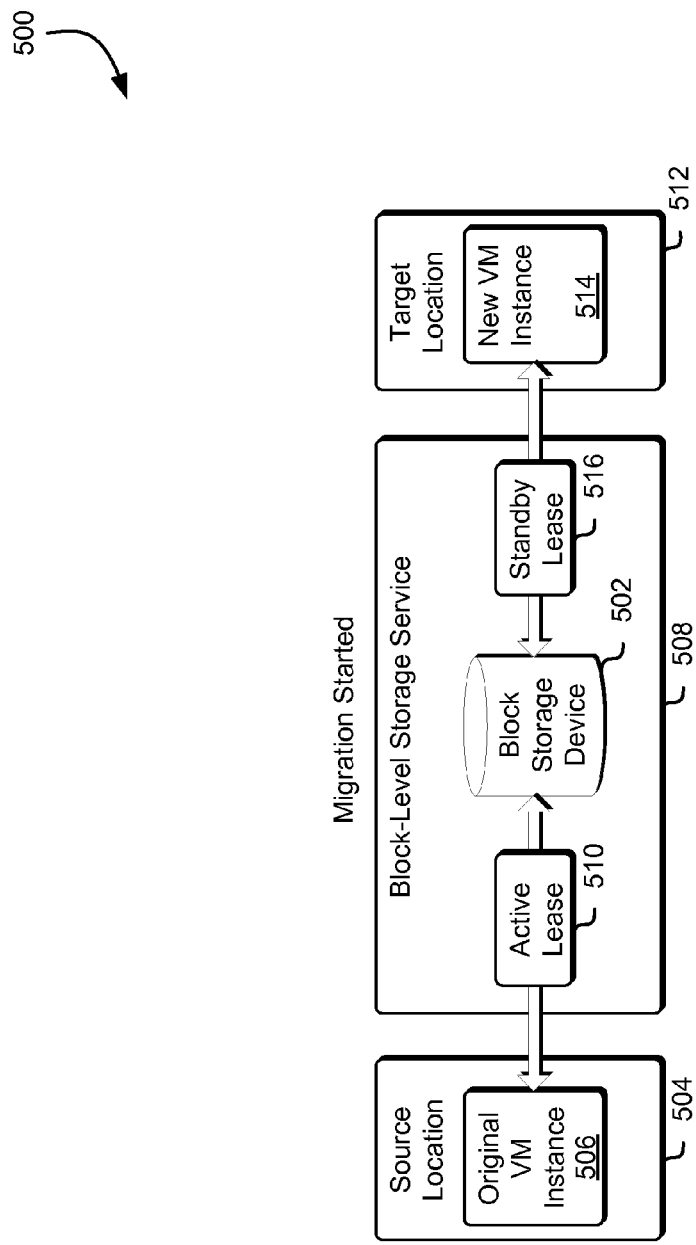
FIG. 5 illustrates an example environment where a block-level storage service provides access to a block storage device after the start of a virtual machine instance migration in accordance with an embodiment.

FIG. 5 illustrates an example environment 500 where a block-level storage service provides access to a block storage device after the start of a virtual machine instance migration as described in connection with FIG. 1 and in accordance with at least one embodiment. After the start of the migration, the original VM instance 506 may be running at the source location 504 with access to a block storage device 502 provided by a block-level storage service 508 as described above. An active lease 510 configured to provide access by the original VM instance 506 to the block storage device 502 is provided by the block-level storage service 508 also as described above.

As a result of the migration having started, a new VM instance 514 may be running in a target location 512 with access to the block storage device 502 provided the block-level storage service 508 as described above. The access by the new VM instance 514 to the block storage device 502 may be provided using a standby lease 516. The standby lease 516 may be configured to provide partial access to the block storage device 502 during the migration. For example, the standby lease 516 may be configured such that the new VM instance 514 may not generate input-output requests to the block storage device 502, but may receive responses to input-output requests generated by other VM instances (e.g., the original VM instance 506). One or both of the active lease 510 and the standby lease 516 may be temporarily provided to the respective VM instances and may be managed by the block-level storage service 508. In the example illustrated in FIG. 5, the active lease 510 is configured such that the original VM instance 506 may generate input-output requests to the block storage device 502 and the standby lease 516 is configured such that the responses to those input-output requests to the block storage device 502 are provided to the new VM instance 514.

Figure 6:
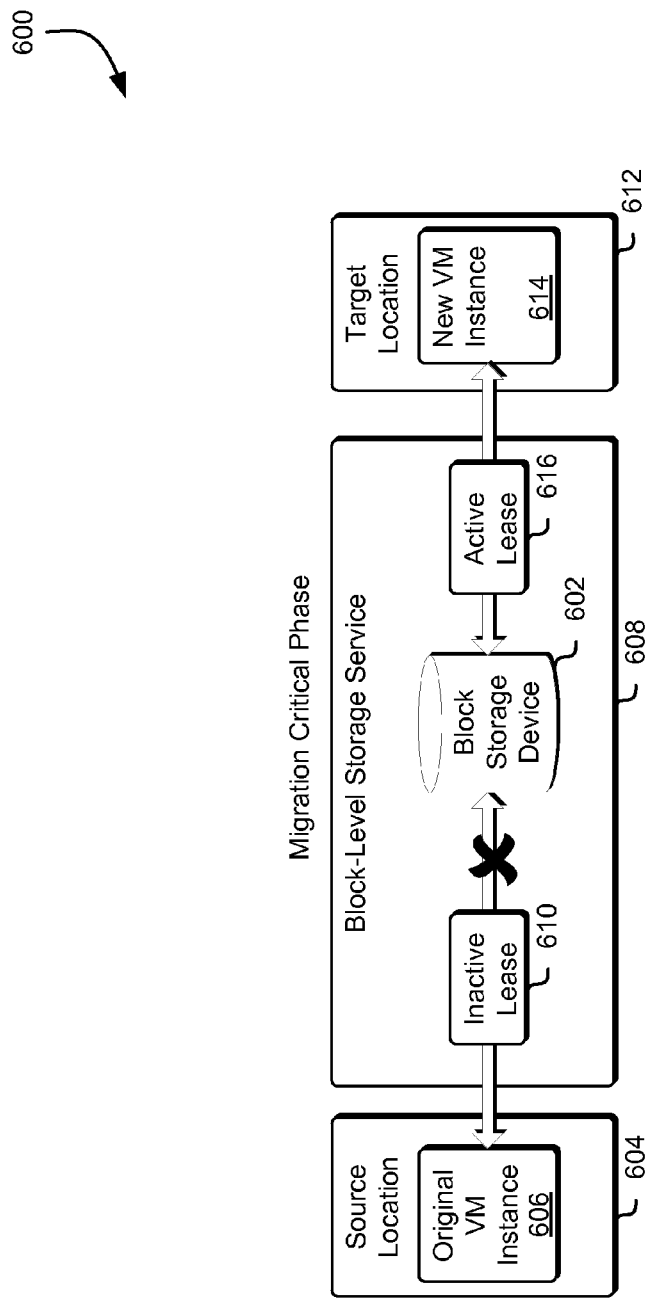
FIG. 6 illustrates an example environment where a block-level storage service provides access to a block storage device during a critical phase of a virtual machine instance migration in accordance with an embodiment.

FIG. 6 illustrates an example environment 600 where a block-level storage service provides access to a block storage device during a critical phase of a virtual machine instance migration as described in connection with FIG. 1 and in accordance with at least one embodiment. When the migration reaches a critical phase, the original VM instance 606 may be running at the source location 604. The lease from the original VM instance 606 to the block storage device 602 provided by a block-level storage service 608 may be an inactive lease 610. An inactive lease 610 may be configured to prevent access by the original VM instance 606 to the block storage device 602 because, during the critical phase of the virtual machine instance migration, input-output requests from the original VM instance may be blocked to avoid synchronization issues and responses to previously submitted input-output requests may also be blocked to avoid synchronization issues. In an embodiment, an inactive lease represents a former and/or expired lease that is used for cleanup or other such administrative purposes, but that is not configured to transmit or receive any input-output requests to or from a VM instance.

Additionally, as a result of the migration having reached a critical phase, a new VM instance 614 may be running in a target location 612 with access to the block storage device 602 provided the block-level storage service 608 as described above. The access by the new VM instance 614 to the block storage device 602 may be provided using a standby lease as described in connection with FIG. 5, or may be provided using an active lease 616 as illustrated in FIG. 6. The standby lease described in connection with FIG. 5 may be configured to provide partial access to the block storage device 602 during the critical phase of the migration and the active lease 616 may be configured to provide full access to the block storage device 602 during the critical phase of the migration.

For example, the active lease 616 may be configured such that the new VM instance 614 may generate input-output requests to the block storage device 602, and may receive responses to those input-output requests. The responses may also have been generated as a result of input-output requests generated by, for example, the original VM instance 606 where such input-output requests were generated before the lease provided to the original VM instance 606 became an inactive lease 610. As described previously, one or both of the inactive lease 610 and the active lease 616 may be temporarily provided to the respective VM instances and may be managed by the block-level storage service 608.

Figure 7:
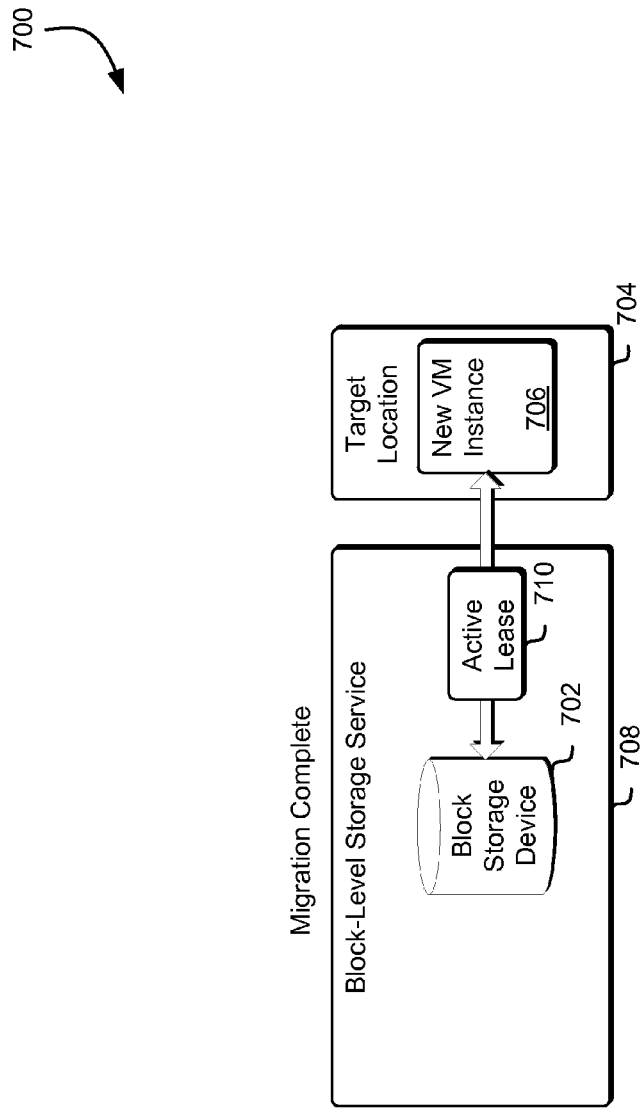
FIG. 7 illustrates an example environment where a block-level storage service provides access to a block storage device after the completion of a virtual machine instance migration in accordance with an embodiment.

FIG. 7 illustrates an example environment 700 where a block-level storage service provides access to a block storage device after the completion of a virtual machine instance migration as described in connection with FIG. 1 and in accordance with at least one embodiment. After the migration, a new VM instance 706 may be running at the target location 704 with access to a block storage device 702 provided by a block-level storage service 708. A lease 710 configured to provide access by the new VM instance 706 to the block storage device 702 is provided by the block-level storage service 708. In the example illustrated in FIG. 7, the lease 710 is an active lease and input-output requests received from the new VM instance 706 may have responses generated and sent to the new VM instance 706 at the target location 704. As described herein, the active lease 710 may be temporarily provided to the new VM instance 706 and may be managed by the block-level storage service 708.

Figure 8:
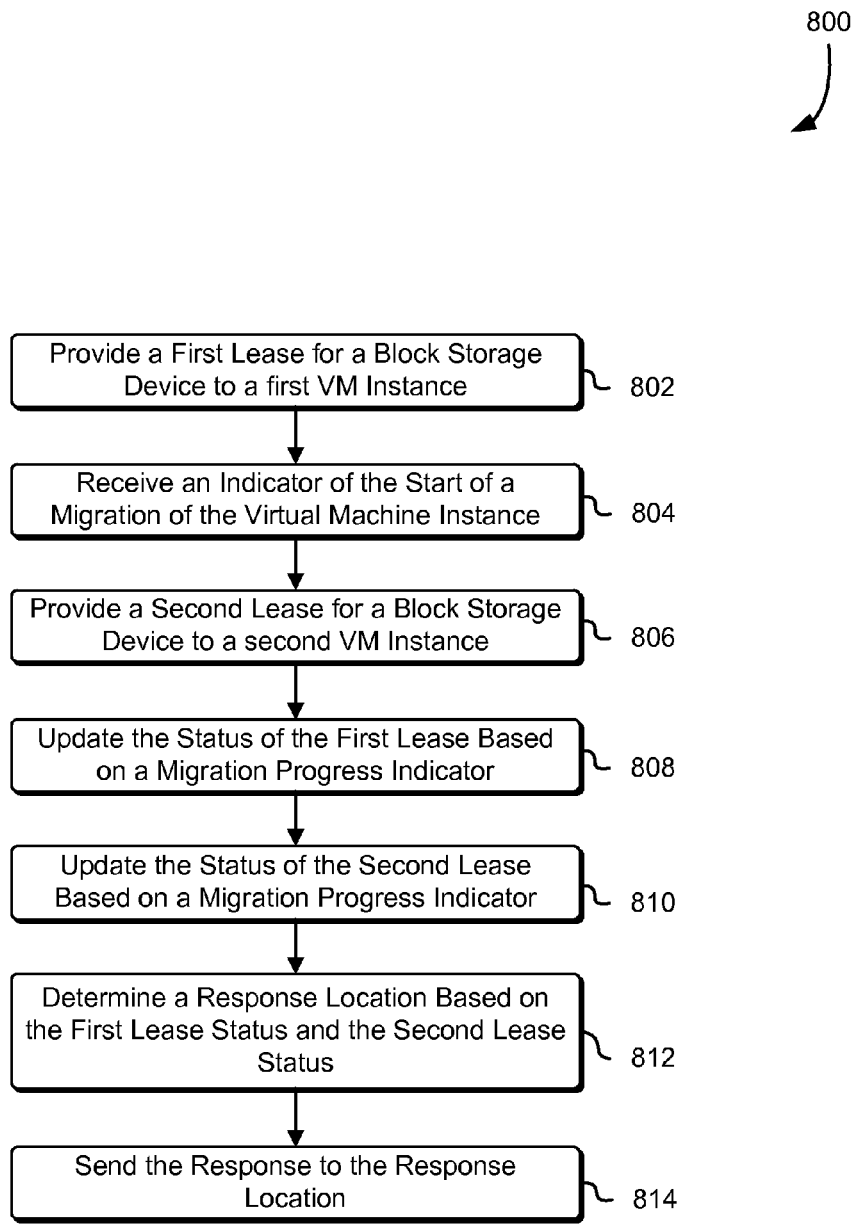
FIG. 8 illustrates an example process for performing a virtual machine migration of a virtual machine with block storage devices using a triangle approach in accordance with an embodiment.

FIG. 8 illustrates an example process 800 for performing a virtual machine migration of a virtual machine with block storage devices using a triangle approach as described in FIG. 1 and in accordance with at least one embodiment. A block-level storage service, such as block-level storage service 120 described in connection with FIG. 1, may perform the process illustrated in FIG. 8.

The block-level storage service, which may be implemented as a service and/or as a distributed service on one or more computer systems provided by a computing resource service provider, may provide 802 a first lease for a block storage device to a first virtual machine instance running at a source location such as a computing device provided by the computing resource service provider. The first lease, an active lease, may provide a first set of credentials to allow the virtual machine instance to access the block storage device.

After receiving an indicator 804 of the start of a migration of the virtual machine instance from the source location to a target location (e.g., a different computing device provided by the computing resource service provider), the block-level storage service may provide 806 a second lease for the block storage device to a second virtual machine instance running at a target location such as a computing device provided by the computing resource service provider. The second lease, a standby lease, may provide a second set of credentials to allow the second virtual machine instance to access the block storage device. The standby lease may allow only partial access to the block storage device. For example, under a standby lease, the virtual machine instance may only receive responses to input-output requests, but may not have credentials to generate such requests.

As the migration progresses, the block-level storage service may update the status of the first lease 808 based at least in part on a migration progress indicator (also referred to herein as an "indicator of progress of the migration") and may also update the status of the second lease 810 based at least in part on a migration progress indicator. For example, the migration progress indicator may indicate that the migration has reached a critical phase and, as a result, the first lease and the second lease may become inactive and/or may enter a standby state. The migration progress indicator may also indicate that the migration has succeeded and, thus, the first lease may become inactive while the second lease becomes active. Similarly, the migration progress indicator may indicate that the migration has failed and, thus, the first lease may become active while the second lease becomes inactive. As may be contemplated, the lease states and migration progress indicators described herein are merely illustrative examples and, as such, other lease states or migration progress indicators may be considered as within the scope of the present disclosure.

Finally, as a result of the lease states and/or the migration progress indicators changing, the block-level storage service may determine 812 a response location for the response and may send the response 814 to the response location. The response location, which in some embodiments is a plurality of locations, is the location that a response to the input-output request should be sent. For example, prior to the migration, the response location may be the source location because input-output requests sent prior to a migration should be sent to the originator of the request. Conversely, during the migration, the response location may be the target location because, while the input-output requests were sent by the virtual machine instance at the source location, the response should be sent to the virtual machine instance at the target location so that a consistent state of the block storage device is maintained.

Figure 9:
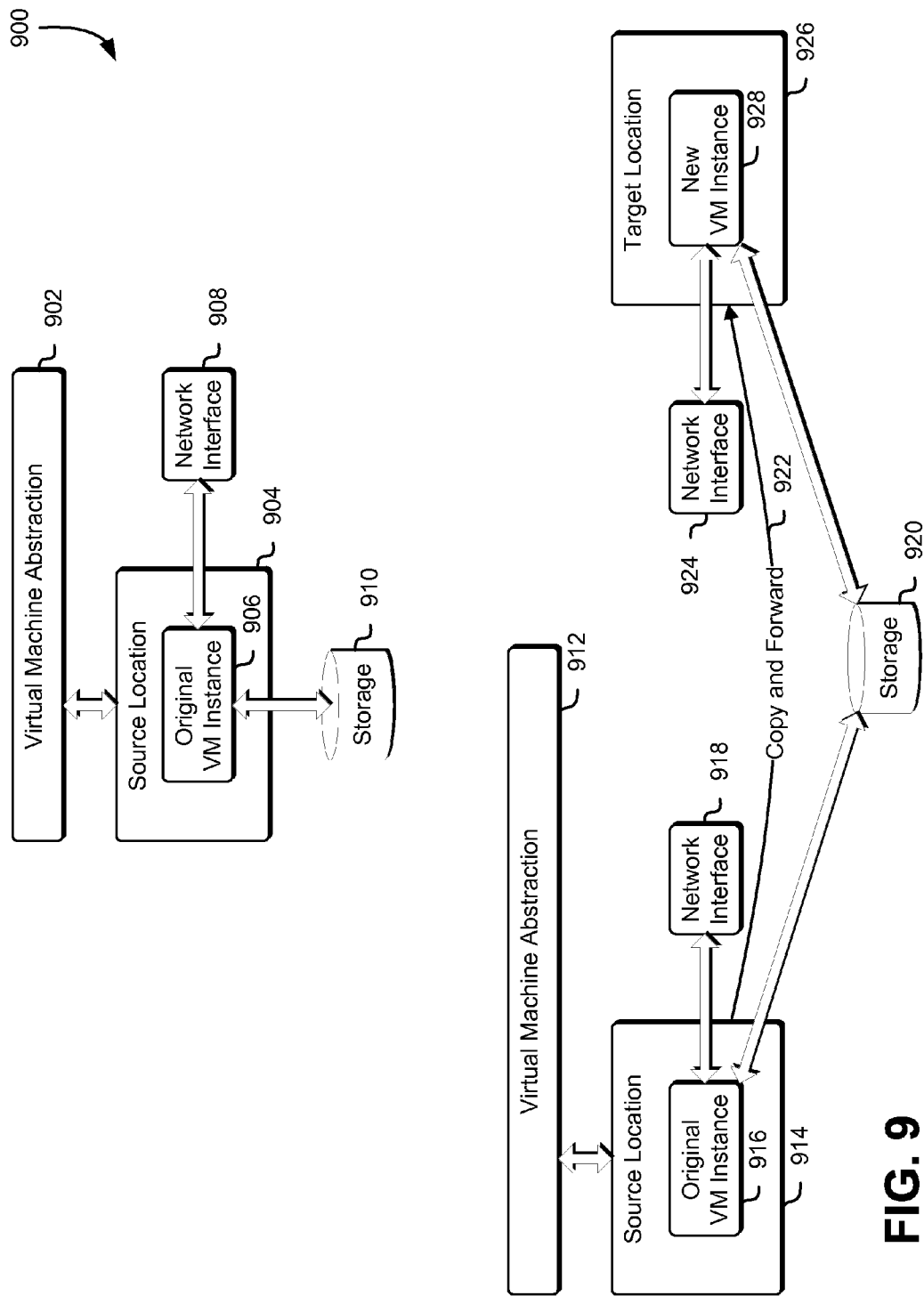
FIG. 9 illustrates an example environment where resources associated with a virtual machine instance migration are managed in accordance with an embodiment.

FIG. 9 illustrates an example environment 900 where resources associated with a virtual machine instance migration are managed as described in FIG. 1 and in accordance with at least one embodiment. The example environment 900 represents the initial part of a migration, such as the migration described herein. A user may have access to a virtual machine abstraction 902 backed by an original VM instance 906 at a source location 904. The original VM instance 906 may include a network interface 908 and one or more storage devices 910 such as the block storage devices described herein. During migration, the user may have the same access to a virtual machine abstraction 912 backed by the original VM instance 916 at a source location 914. The original VM instance 916 may still include a network interface 918 and one or more storage locations 920, but the network interface 918 may be shared by a new VM instance 928 at a target location 926 and/or may be duplicated as a new network interface 924. Additionally, the access to the one or more storage locations 920 may be managed by a block-level storage service using one or more leases. Additionally, the one or more storage locations 920 may be shared between the original VM instance 916 and the new VM instance 928. During migration, memory and/or state information may be copied and forwarded 922 from the original VM instance 916 to the new VM instance 928.

Figure 10:
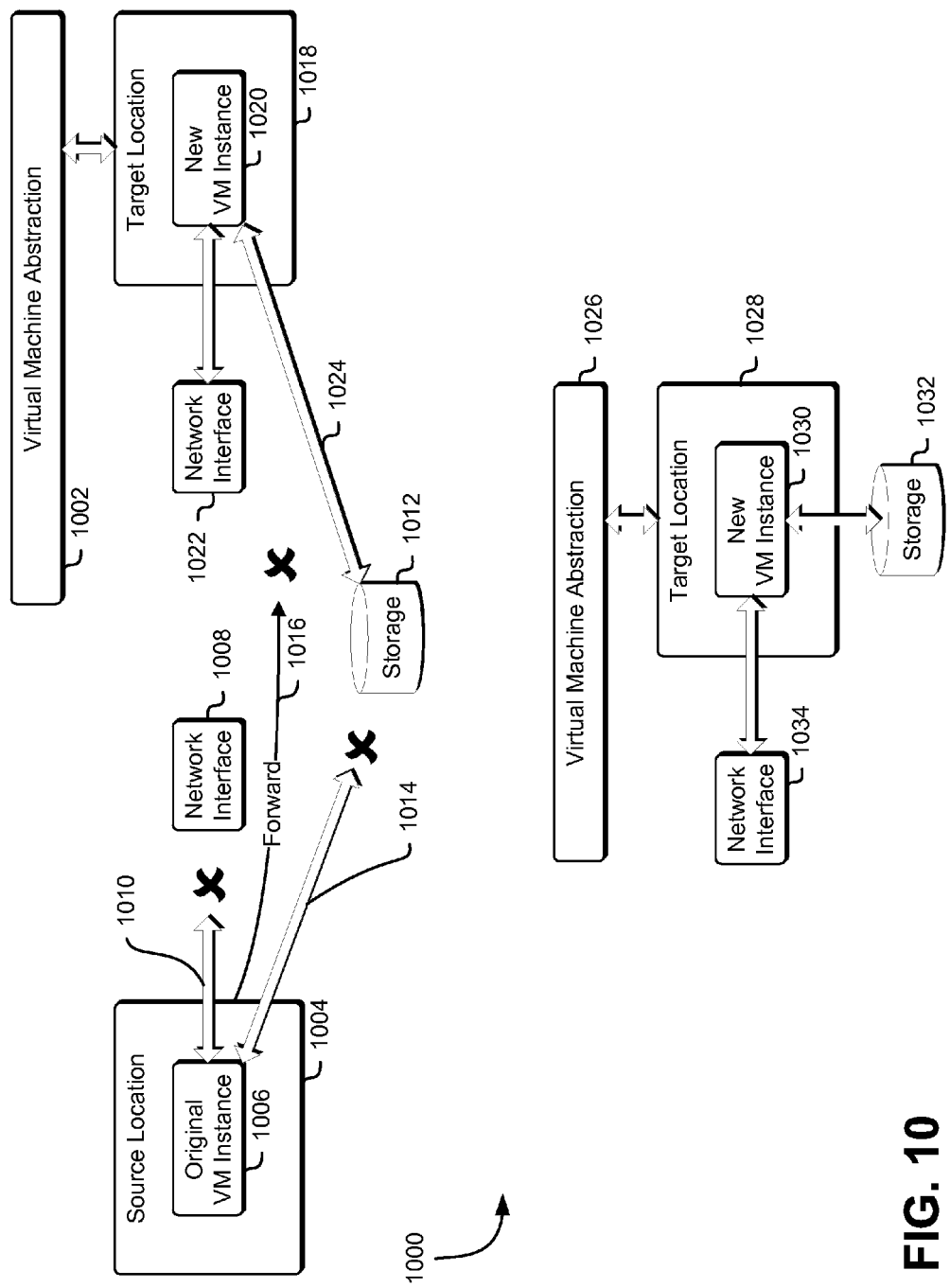
FIG. 10 illustrates an example environment where resources associated with a virtual machine instance migration are managed in accordance with an embodiment.

FIG. 10 illustrates an example environment 1000 where resources associated with a virtual machine instance migration are managed as described in FIG. 1 and in accordance with at least one embodiment. The example environment 1000 represents the second part of a migration such as the migrations described herein. A user may have access to a virtual machine abstraction 1002, but because the migration is reaching completion, the virtual machine abstraction 1002 may be backed by a new VM instance 1020 at a target location 1018. The new VM instance 1020 may have a network interface 1022 and access 1024 to one or more storage locations 1012. The access to the one or more storage locations 1012 may be managed by a block-level storage service using one or more leases. Meanwhile, the original VM instance 1006 at the source location 1004 may be in the process of being torn down with, for example, an inactive lease. For example, the connection 1010 to the network interface 1008 may be terminated, the connection 1014 to the one or more storage locations 1012 may be removed or marked inactive, and the packet forwarding 1016 from the original VM instance to the new VM instance may be stopped after the original VM instance 1006 has converged.

After the successful migration, the user may have access to a virtual machine abstraction 1026 backed by the new VM instance 1030 at the target location 1028. Except for the different location, this new VM instance 1030 should appear to be the same as the original VM instance 906 described in connection with FIG. 9, with a network interface 1034 and access to one or more storage locations 1032.

Figure 11:
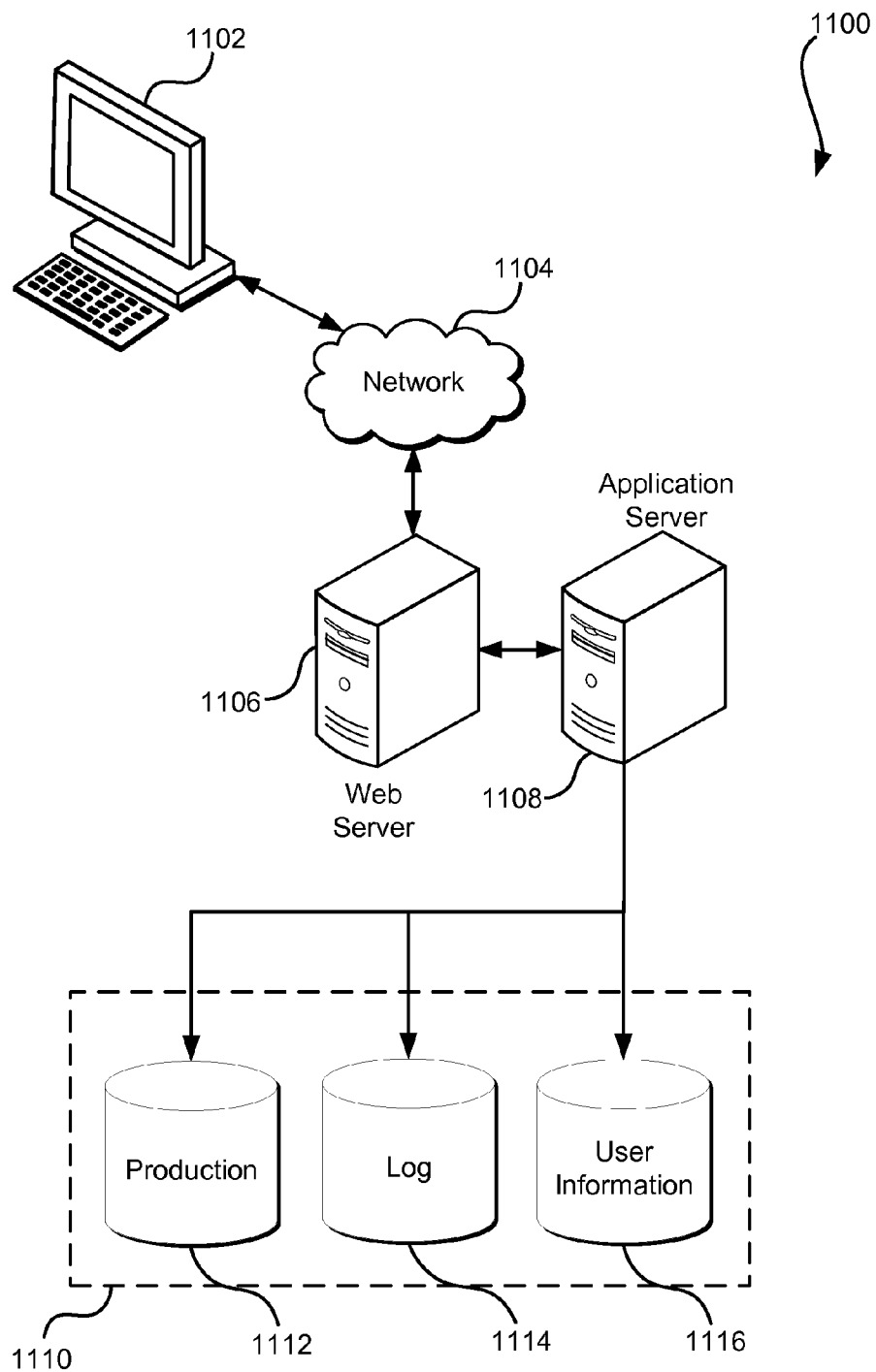
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a first lease associating a virtual machine instance with a block storage device, the block storage device provided by a block-level storage service, the first lease specifying a first policy of access to the block storage device by the virtual machine instance, the first lease having a first status of active;
    providing access to the virtual machine instance;
    starting a migration of the virtual machine instance from a source computing device to a target computing device;
    generating a second lease associating the virtual machine instance in the target computing device with the block storage device, the second lease specifying a second policy of access to the block storage device by the virtual machine instance, the second lease having a second status of standby, while the first lease has the first status of active;
    updating the first status and the second status based at least in part on an indicator of progress of the migration;
    based at least in part on the indicator of progress indicating a phase of the migration, pausing the access to the virtual machine instance;
    receiving a set of input-output requests addressing the block storage device from the virtual machine instance; and
    providing a response to input-output requests of the set of input-output requests, the response at least specifying a response location to which to send the response, the response location determined based at least in part on whether the first status is active, the response location selected from the source computing device and the target computing device, the response location corresponding to the source computing device before the phase and corresponding to the target computing device after the phase; and
    based at least in part on the indicator of progress indicating the phase has ended, resuming the access to the virtual machine instance.

2. The computer-implemented method of claim 1, wherein the first status is changed to inactive as a result of the indicator of progress indicating the phase of the migration.

3. The computer-implemented method of claim 1, wherein the second status is changed to active as a result of the first status being inactive.

4. The computer-implemented method of claim 1, wherein the response location is further determined based at least in part on whether the second status is not inactive.

5. A system, comprising at least one computing device that implement one or more services, wherein the one or more services at least:
 obtain a first lease associating a virtual machine instance with a block storage device, the block storage device provided by a block-level storage service, the first lease specifying a first policy of access to the block storage device by the virtual machine instance; and
 in response to a start of a migration of the virtual machine instance from a first location to a second location, at least:
  generate a second lease associating the virtual machine instance in the second location with the block storage device, the second lease specifying a second policy of access to the block storage device by the virtual machine instance;
  determine a first status of the first lease and a second status of the second lease based at least in part on an indicator of progress of the migration;
  based at least in part on the indicator of progress of the migration indicating a phase of the migration, pausing access to the virtual machine instance, the access to the virtual machine instance provided by the virtual machine instance running in the first location before the phase of the migration;
  provide a response to input-output requests of a set of input-output requests addressing the block storage device, input-output requests received from the virtual machine instance, the response specifying a set of response locations, the set of response locations based at least in part on the first status and the second status; and
  based at least in part on the indicator of progress indicating the phase of the migration has ended, providing the access to the virtual machine instance via the second location after the phase of the migration.

6. The system of claim 5, wherein response locations of the set of response locations are selected from the first location and the second location.

7. The system of claim 6, wherein the set of response locations includes the first location if the first status is active.

8. The system of claim 6, wherein the set of response locations includes the second location if the second status is not inactive.

9. The system of claim 5, wherein the response is provided to response locations of the set of response locations.

10. The system of claim 5, wherein the indicator of progress of the migration includes at least: migration success or migration failure.

11. The system of claim 10, wherein:
 the first status is changed to inactive if the indicator of progress of the migration is migration success; and
 the second status is changed to active if the indicator of progress of the migration is migration success.

12. The system of claim 10, wherein:
 the first status is changed to active if the indicator of progress of the migration is migration failure; and
 the second status is changed to inactive if the indicator of progress of the migration is migration failure.

13. A non-transitory computer-readable storage medium having stored thereon executable instructions that, upon execution by one or more processors of a computer system, cause the computer system to at least:
 begin a migration of a virtual machine instance from a first location to a second location, the virtual machine instance provided with a first set of credentials specifying a first policy of access by the virtual machine instance running in the first location to a block storage device, the virtual machine instance provided with a second set of credentials specifying a second policy of access by the virtual machine instance running in the second location to the block storage device;
 based at least in part on detecting a phase of the migration, pausing access to the virtual machine instance, the access to the virtual machine instance provided by the virtual machine instance running in the first location before the phase of the migration;
 provide a response to an input-output request addressing the block storage device and received from the virtual machine instance during the migration, the response specifying one or more response locations, the one or more response locations based at least in part on an indicator of progress of the migration; and
 based at least in part on determining that the phase has ended, as a result of reaching an end of the phase of the migration, providing the access to the virtual machine instance via the second location after the phase of the migration.

14. The non-transitory computer-readable storage medium of claim 13, wherein the first set of credentials and the second set of credentials are temporary sets of credentials with a duration determined by the computer system.

15. The non-transitory computer-readable storage medium of claim 13, wherein:
 the first set of credentials is specified by a first lease obtained from a block-level storage service associated with the block storage device; and
 the second set of credentials is specified by a second lease generated by the block-level storage service associated with the block storage device in response to the migration.

16. The non-transitory computer-readable storage medium of claim 13, wherein:
 the first location is a computing device; and
 the second location is a different computing device.

17. The non-transitory computer-readable storage medium of claim 13, wherein the indicator of progress of the migration is at least one of: no migration, migration started, critical phase, migration success, or migration failure.

18. The non-transitory computer-readable storage medium of claim 17, wherein the one or more response locations includes the first location if the indicator of progress is no migration, migration started, or migration failure.

19. The non-transitory computer-readable storage medium of claim 17, wherein the one or more response locations includes the second location if the indicator of progress is migration started or migration success.

20. The non-transitory computer-readable storage medium of claim 17, wherein the one or more response locations includes the first location and the second location while the indicator of progress of the migration indicates the phase.

* * * * *